(12) United States Patent
Ji

(10) Patent No.: US 7,840,187 B2
(45) Date of Patent: Nov. 23, 2010

(54) SYSTEM AND METHOD FOR DYNAMIC FREQUENCY SELECTION BASED ON SPECTRUM ETIQUETTE

(75) Inventor: Baowei Ji, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1093 days.

(21) Appl. No.: 11/526,454

(22) Filed: Sep. 25, 2006

(65) Prior Publication Data

US 2007/0105562 A1   May 10, 2007

Related U.S. Application Data

(60) Provisional application No. 60/735,972, filed on Nov. 10, 2005.

(51) Int. Cl.
*H04B 15/00* (2006.01)
*H04B 1/00* (2006.01)
(52) U.S. Cl. .................. 455/63.3; 455/63.2; 455/62
(58) Field of Classification Search ............... 455/63.1, 455/63.3, 62, 452, 186.1, 422.1, 446–449, 455/7, 63.2
See application file for complete search history.

(56) References Cited

U.S. PATENT DOCUMENTS 6,154,654 A    11/2000  Mao
6,580,913 B1   6/2003   Chao et al.
2002/0102994 A1  8/2002   Tuutijarvi
2004/0157613 A1  8/2004   Steer et al.
2005/0096062 A1  5/2005   Ji et al.
2005/0124335 A1  6/2005   Cave et al.

FOREIGN PATENT DOCUMENTS

RU           94028275 A1    6/1996

OTHER PUBLICATIONS

Communication pursuant to Article 94(3) EPC dated Apr. 2, 2009 in connection with European Patent Application No. 06 023 241.0.
European Patent Application No. 06023241.0 Search Report dated Feb. 22, 2007.
Patent Cooperation Treaty Application No. PCT/KR2006/004578, Search Report dated Feb. 13, 2007.
Decision on Grant dated Dec. 14, 2009 in connection with Russian Patent Application No. 2008118342.

*Primary Examiner*—Eugene Yun

(57) ABSTRACT

The present disclosure relates generally to systems and methods for dynamic frequency selection based on spectrum etiquette. In one example, the method includes identifying multiple frequencies usable by a central subdivision in a wireless communication system that are not in use by neighboring subdivisions. The method may determine whether the frequencies include a frequency that cannot be used by the neighboring subdivisions and, if the frequency exists, may select the frequency for use by the central subdivision. If such a frequency does not exist, the method may identify a frequency that can be used by fewer of the neighboring subdivisions than other frequencies and select the identified frequency for use by the central subdivision.

20 Claims, 8 Drawing Sheets

SYSTEM AND METHOD FOR DYNAMIC FREQUENCY SELECTION BASED ON SPECTRUM ETIQUETTE

CLAIM OF PRIORITY

This application claims priority from U.S. Provisional Patent Application Ser. No. 60/735,972, filed on Nov. 10, 2005, and entitled "SYSTEMS AND METHODS FOR COMMUNICATIONS", which is hereby incorporated by reference in its entirety.

BACKGROUND

Wireless communications systems generally use multiple frequencies to provide greater bandwidth than would be possible using a single frequency. Such systems, particularly large-scale systems such as those used for telecommunications, are typically divided into cells that provide wireless coverage to a particular area, although some overlap may exist between cells. In some systems, cells may be further divided into sectors. The use of multiple frequencies may cause interference between cells or between sectors.

To avoid such inter-cell or inter-sector interference, some wireless communication technologies may use spectrum planning to avoid interference between cells. Such advance spectrum planning may be used in technologies such as time division multiple access (TDMA) systems (e.g., Global System for Mobile communication (GSM), General Packet Radio Service (GPRS), and Enhanced Data Rates for GSM Evolution (EDGE) systems). Some systems, such as those using Orthogonal Frequency Division Multiplexing (OFDM) technology, may avoid inter-cell interference by requiring that neighboring cells use different frequencies. This may be accomplished, for example, by planning the frequency assignment in advance or by using a central controller to dynamically assign a frequency to each cell. However, assigning frequencies in advance may not be desirable in some situations, and relying on a central controller to assign frequencies may introduce issues such as scalability and point-of-failure. What is needed are a system and method for dynamically assigning frequencies in a wireless communications system.

SUMMARY

In one embodiment, a method comprises identifying a plurality of frequencies usable by a central subdivision in a wireless communication system that are not in use by neighboring subdivisions in the wireless communication system. The method determines whether the plurality of frequencies includes a first frequency that cannot be used by the neighboring subdivisions and selects the first frequency for use by the central subdivision if the first frequency exists. The method identifies a second frequency of the plurality of frequencies that can be used by fewer of the neighboring subdivisions than other frequencies of the plurality of frequencies if the first frequency does not exist, and selects the second frequency for use by the central subdivision.

In another embodiment, a method comprises identifying a first set of frequency channels representing frequency channels usable by a central subdivision in a wireless communication system. The method identifies a second set of frequency channels representing frequency channels from the first set that are not in use by neighbor subdivisions in the wireless communication system, and identifies a third set of frequency channels representing frequency channels from the second set that cannot be used by the neighbor subdivisions. A first frequency channel is selected from the third set for use by the central subdivision if the third set includes at least one frequency channel, and a second frequency channel is selected from the second set for use by the central subdivision if the third set does not contain at least one frequency channel.

In yet another embodiment, a wireless communication system comprises a central subdivision and a central base station. The central base station provides wireless coverage for the central subdivision and is coupled to a processor configured to execute instructions stored on a memory. The instructions include instructions for identifying a first set of frequencies usable by the central subdivision and identifying a second set of frequencies containing frequencies from the first set that are not in use by neighbor subdivisions of the central subdivision. The instructions also include instructions for determining whether the second set includes a first frequency that cannot be used by the neighbor subdivisions, and instructions for selecting the first frequency for use by the central subdivision if the first frequency exists.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
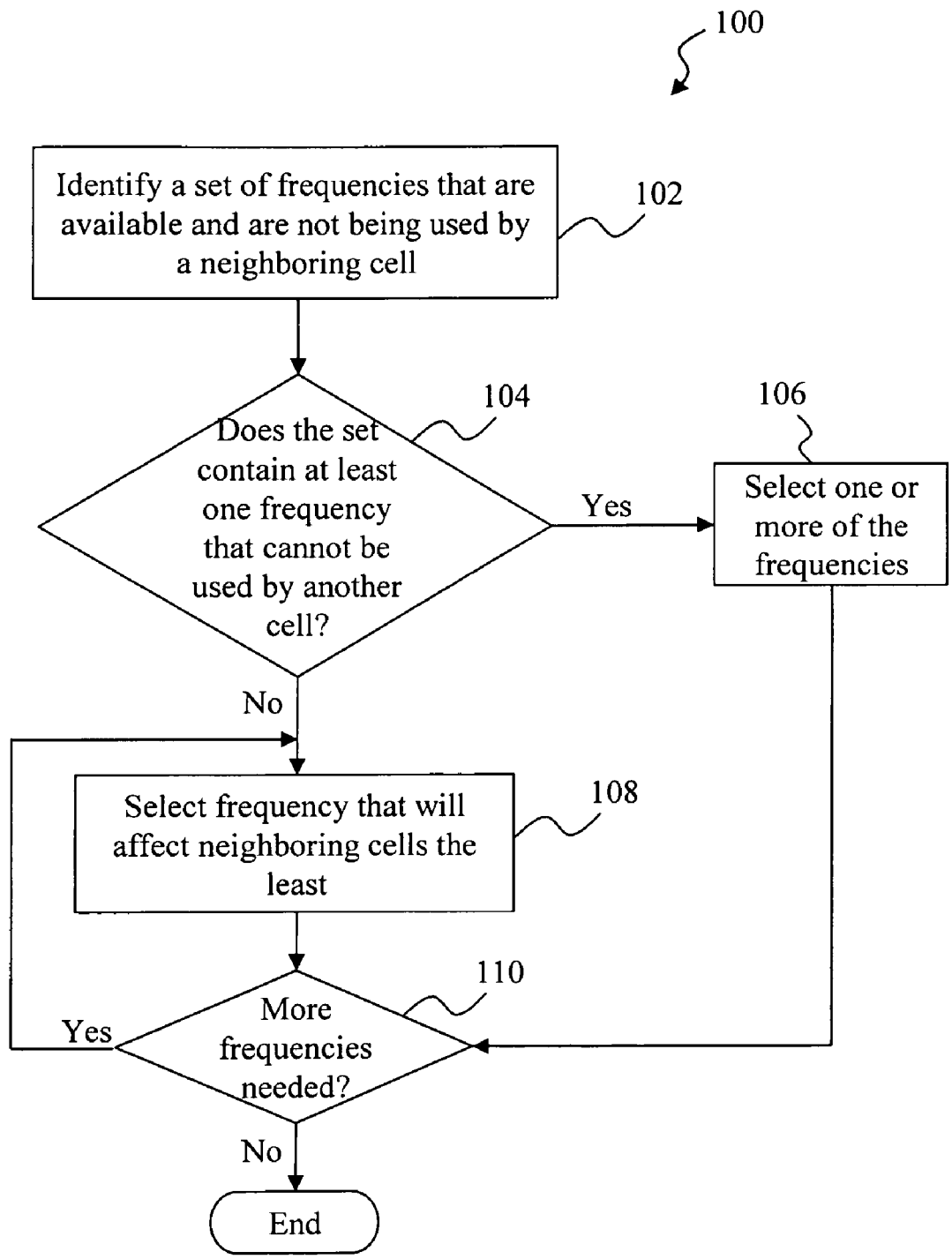
FIG. 1 is a flowchart illustrating one embodiment of a method for dynamically selecting a frequency based on spectrum etiquette.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 may be used to dynamically select one or more frequencies for a subdivision (e.g., a cell, sector, or other network segment) of a wireless communication network. It is understood that the terms "cell" and "sector" are used throughout the present disclosure for purposes of illustration and may be interchangeable depending on the configuration of a particular network. In the present example, each cell may share one or more frequencies with neighboring cells, although a cell may also be able to use one or more frequencies not available to the neighboring cells. The neighboring cells may be limited to adjacent cells or may include cells beyond the adjacent cells.

Dynamic frequency selection may be desirable, for example, as more of the frequency spectrum becomes available for license-exempted or light-licensing operations. In systems based on such concepts, each cell or sector may dynamically identify and select a frequency with the consideration of avoiding inter-cell interference. The need for accomplishing such identification and selection dynamically is due in part to the difficulty of advance frequency planning in systems where frequency availability changes over time. In systems that must handle changing frequency availability, a centralized decision-making scheme may present issues such as scalability and point-of-failure. Although some simple schemes may exist for spectrum sharing negotiations between, for example, two neighboring cells, such schemes do not satisfy the need for systematic dynamic frequency-sharing in large-scale wireless systems. Accordingly, the method 100 may be used in such systems to dynamically identify and select available frequencies for a cell and/or a sector while minimizing the impact of the selection on neighboring cells and/or sectors.

In step 102, an access point (e.g., a base station) or other processing means associated with a cell identifies a set of frequencies that are available for use by the cell and are not being used by a neighboring cell. In the present example, a frequency may be identified as available if it is picked up by the cell and the cell is configured to use that frequency, and may include one or more backup bands. In step 104, a determination may be made as to whether the set of frequencies contains at least one frequency that cannot be used by the neighboring cells. If a frequency exists that cannot be used by the neighboring cells, the method 100 continues to step 106, where the frequency is selected for use by the cell. If the cell needs multiple frequencies and there are multiple frequencies available as determined in step 104, the cell may select enough of the frequencies to satisfy its frequency demands.

In step 110, a determination may be made as to whether the cell has obtained enough frequencies. If not (e.g., if there were not enough frequencies identified in step 104 to meet the cell's needs), the method 100 may move to step 108. The method 100 may also move directly to step 108 from step 104 if no frequencies are identified that cannot be used by the neighboring cells. In step 108, a frequency is selected from the set of frequencies that will have the least effect on the surrounding cells. The selection may be based on one or more parameters. For example, a frequency may be selected that can be used by the smallest number of neighboring cells. In another example, the frequency may be selected based on anticipated traffic volume for a given cell or a given time period (e.g., rush hour). The method may then continue to step 110, and determine whether more frequencies are needed by the cell. If so, the method 100 may return to step 108. In some embodiments, the method 100 may return to steps 102, 104, and/or 106, depending on the configuration of the cell. For example, if there are not enough frequencies for the cell, the method 100 may return to step 102 and determine if additional frequencies have become available. Accordingly, the method 100 may be used to dynamically select one or more frequencies for a cell while attempting to minimize the impact of the frequency selection on neighboring cells.

Figure 2:
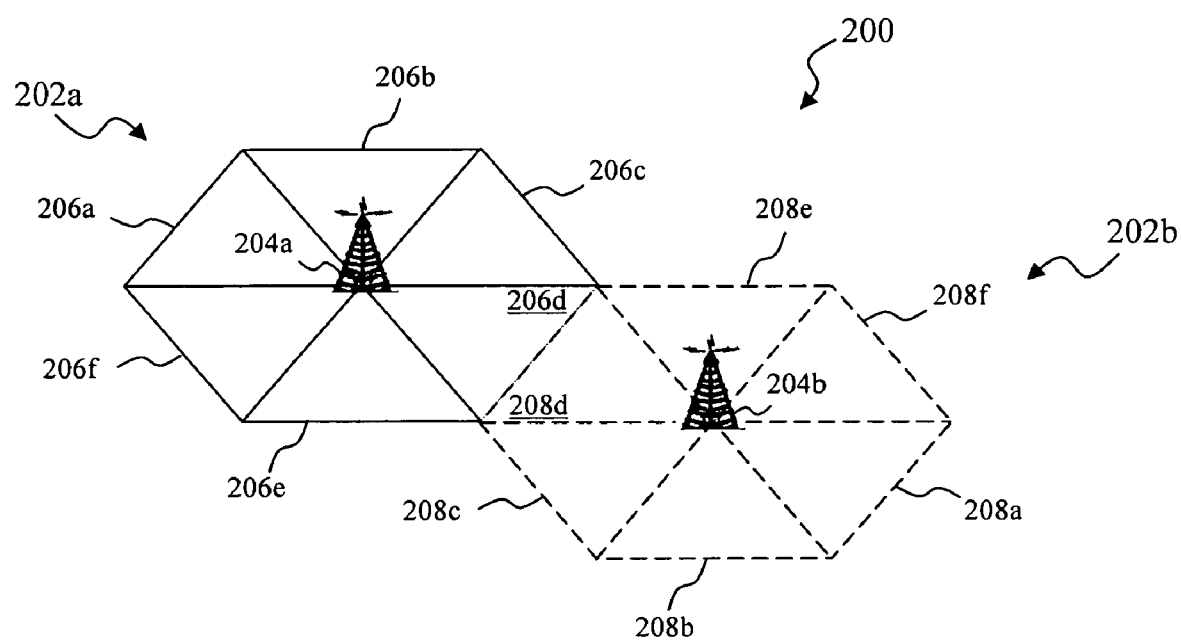
FIG. 2 is a diagram of one embodiment of a network in which the method of FIG. 1 may be implemented.

Referring to FIG. 2, in one embodiment, a portion of a wireless network 200 is illustrated with cells 202a and 202b and corresponding access points (e.g., base stations) 204a and 204b. Although not shown, it is understood that base stations 204a and 204b may include processors, memories, and other components that enable the base stations to receive, store, retrieve, process, and transmit instructions and data over wireless and/or wireline communication links. Furthermore, at least some functionality of a base station may be distributed and located elsewhere, either within a cell or outside of a cell.

In the present example, the network 200 may be a wireless regional access network (WRAN), but it is understood that the wireless network 200 may also represent many different types of wireless networks. In some embodiments, the wireless network 200 may be configured to use available television (TV) spectrum frequencies in certain areas (e.g., rural areas) to provide additional bandwidth to user terminals. For example, a fixed point-to-multipoint WRAN may be configured to use ultra high frequency and very high frequency (UHF/VHF) TV bands between 54 and 862 MHz. Such specifications may comply, for example, with those developed by the Institute of Electrical and Electronics Engineers (IEEE) 802.22 Working Group on WRANs. It is understood, however, that the present disclosure is not limited to TV spectrum frequencies and that other frequencies may be used in place of or in addition to those in the TV spectrum.

In the present example, the cells 202a and 202b are shown in a sectorized configuration. More specifically, the cell 202a is divided into sectors 206a-206f and the cell 202b is divided into sectors 208a-208f. It is understood that the terms of central sector/cell and neighboring sector/cell are relative. For example, if there is no sectorization in the illustrated topology, a central cell may have six neighbor cells (see FIG. 5 for an example). Furthermore, a neighbor cell or sector may not be immediately adjacent to a central sector in some embodiments. For example, any of the illustrated sectors may be a neighbor sector to sector 208d. Accordingly, the present disclosure is not limited to the use of immediately adjacent neighbor cells. In the present illustration using sectorization, there are six sectors per cell and a central sector has three neighboring sectors. It is understood that more or fewer sectors may be used and that the illustrated configuration of six sectors per cell is for purposes of example only.

To avoid inter-cell and inter-sector interference, neighboring cells and/or sectors should generally cooperate when deciding what frequency bands to use. In the network 200, each cell 202a and 202b may pick up an available frequency band dynamically, which forecloses the possibility of advance frequency planning and assignment. Without cooperation between the cells and/or sectors, the frequency selection in a particular cell may prevent neighboring cells from properly functioning. For example, assume that the available frequency channels at base stations 202a and 202b are $\{1, 3\}$ and $\{1, 2, 3\}$, respectively. If base station 202b decides to use channels $\{1, 3\}$, then base station 202a has no available channel. Furthermore, cooperation may be used to facilitate load balancing within the wireless network 200. For example, if base station 202a is heavily loaded (e.g., has a large amount of traffic) and base station 202b is not heavily loaded, then base station 202a may use $\{1, 3\}$ and base station 202b may use $\{2\}$. This provides base station 202a with additional bandwidth to handle its heavier load while allowing base station 202b to still provide service. Accordingly, each base station 202a and 204b may be configured to dynamically select frequencies to be used in its corresponding cells and/or sectors.

Figure 3:
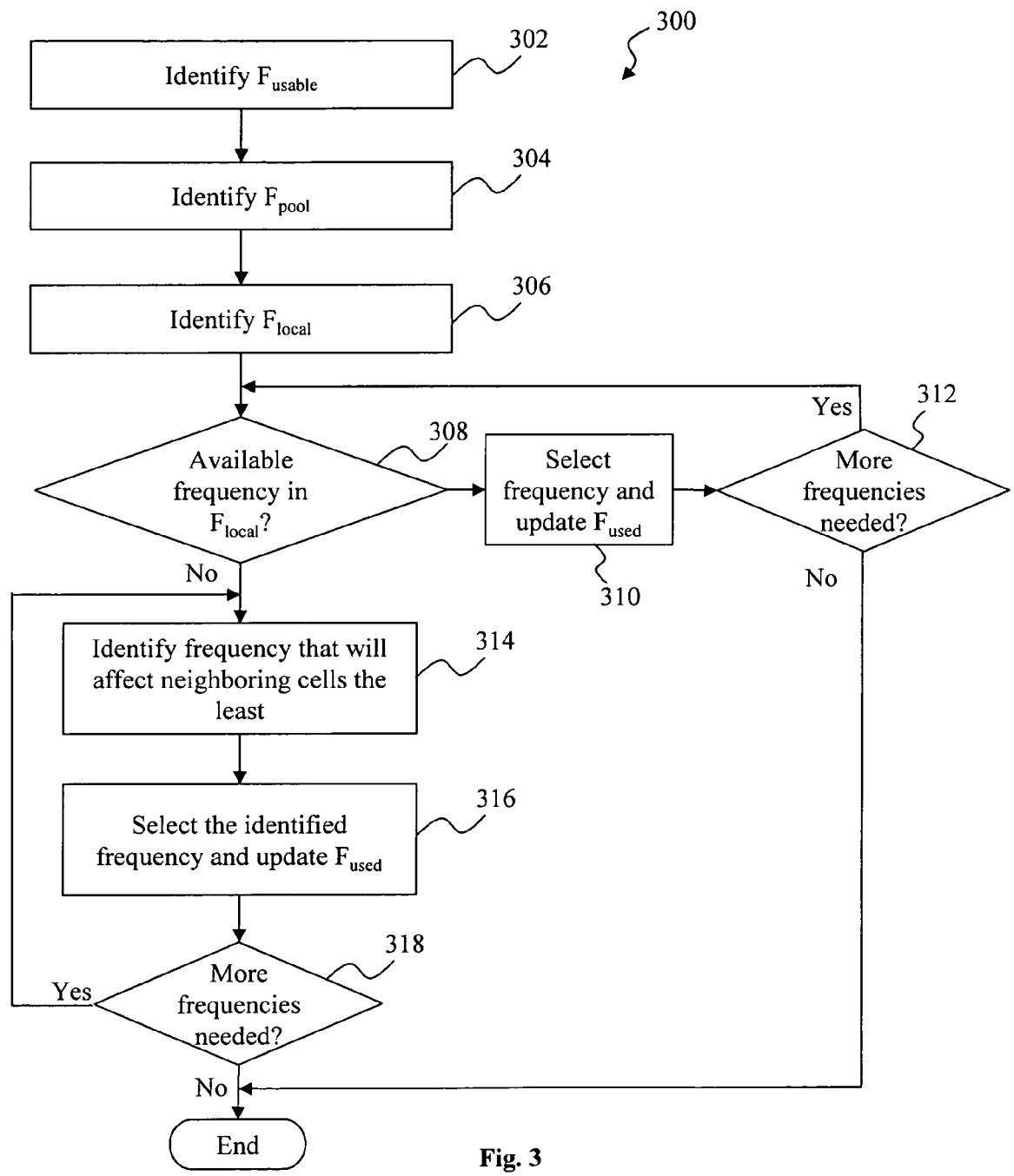
FIG. 3 is a flowchart illustrating another embodiment of a method for dynamically selecting a frequency based on spectrum etiquette.

Referring to FIG. 3, a method 300 illustrates a more detailed embodiment of a process for dynamically selecting one or more frequencies. The following entities may be defined for the method 300:

$F_{usable, ID}$=frequencies that do not interfere with incumbent uses. These frequencies may always be usable or may be usable according to defined parameters (e.g., during certain times of day, etc.).

$F_{used, ID}$=frequencies that the central sector has selected for use, which may include one or more backup bands.

$F_{pool}$=the frequencies that are usable by the central sector and are not in use by neighbor sectors=$F_{usable, ID}$\($F_{used, N1}$ U $F_{used,N2}$ U $F_{used,N3}$).

$F_{local}$=the frequencies that are usable by the central sector and not usable by neighbor sectors=$F_{pool}$\{$F_{usable,N1}$ U $F_{usable,N2}$ U $F_{usable,N3}$}.

The symbols "U" and "\" are set notation operators representing union and exclusion, respectively. The term "ID" represents a sector ID (and may represent a cell ID in non-sectorized examples). In the present example, "ID" represents the ID of the central sector, whereas neighbor sectors are denoted by "N1", "N2", and "N3".

Figure 4A:
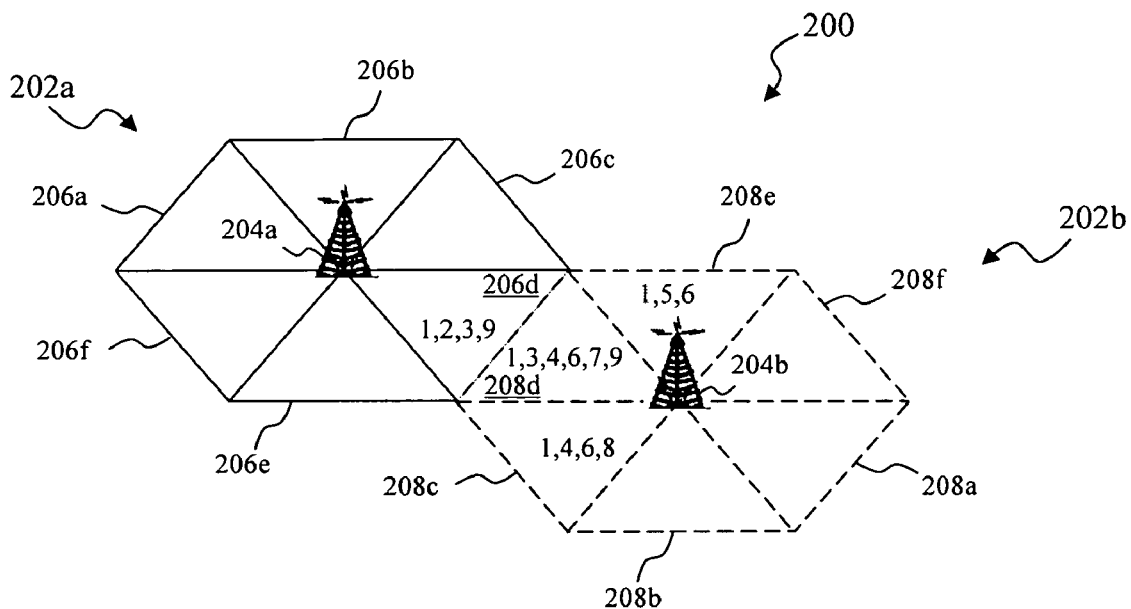
FIGS. 4a-4g are diagrams of the network of FIG. 2 illustrating an example of frequency selection using the method of FIG. 3.
Figure 4B:
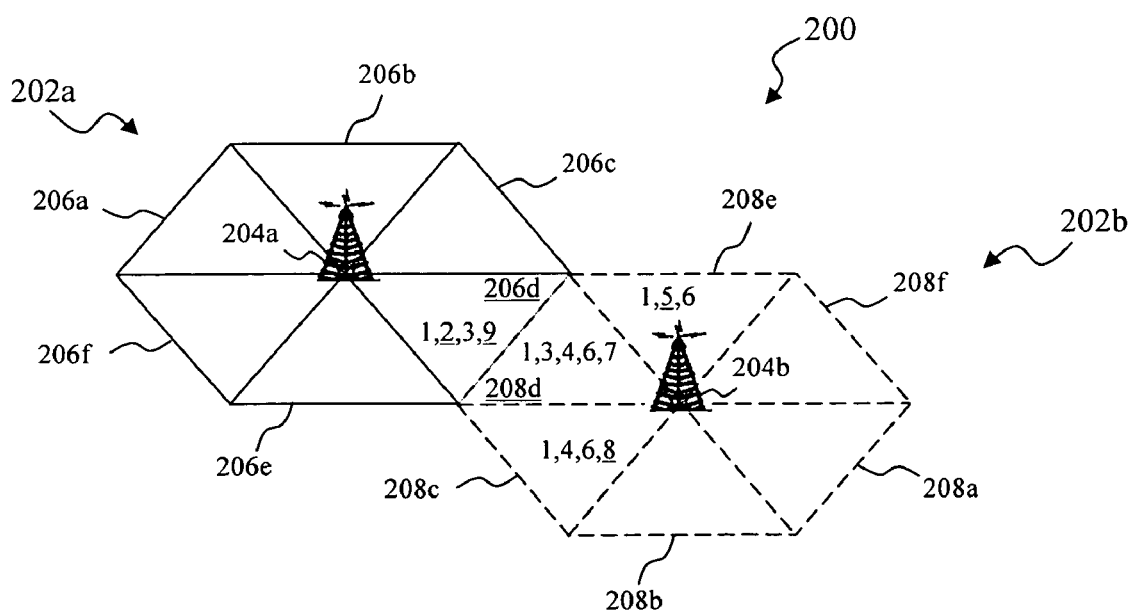
Figure 4C:
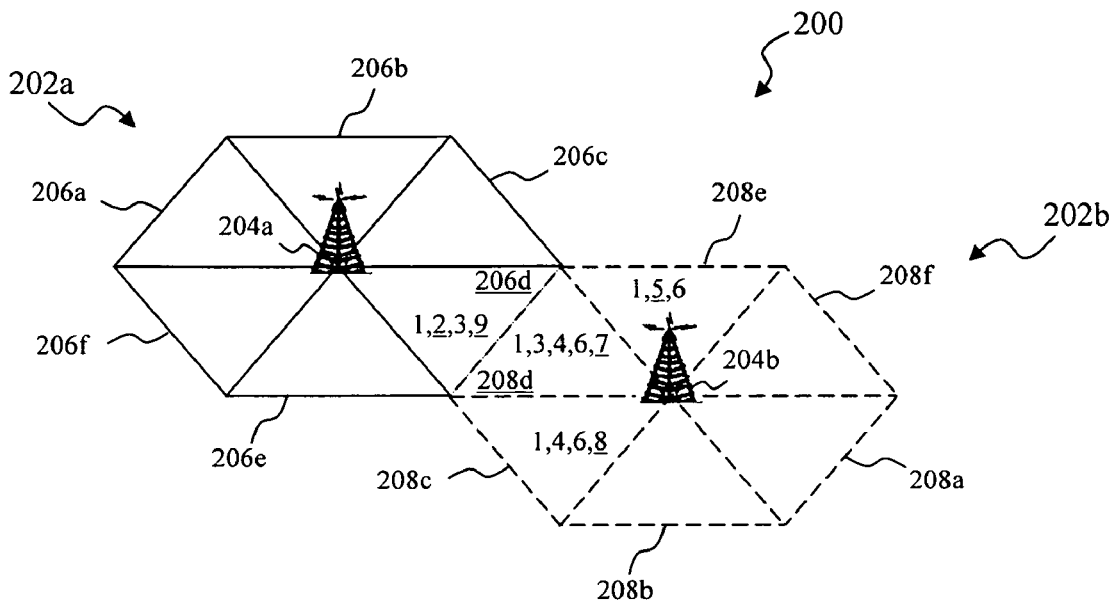
Figure 4D:
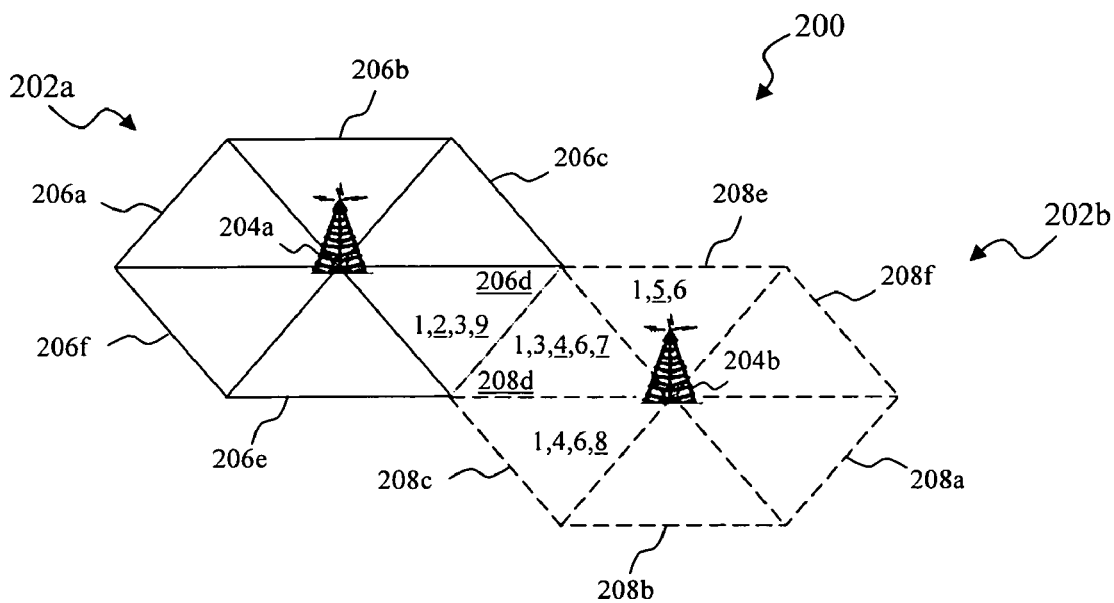

With continued reference to FIG. 3 and additional reference to FIGS. 4a-4g, the wireless network 200 of FIG. 2 is used for purposes of example as a system within which the method 300 may be executed. It is understood that the method 300 may be used in other networks, including cellular networks (e.g., TDMA networks). In the example of FIG. 4a, the sector 208d is the central sector, and sectors 206d, 208e, and 208c are neighbor sectors N1, N2, and N3, respectively.

In step 302 (and corresponding FIG. 4a), the central sector 208d may identify $F_{usable,ID}$. As described above, this may include frequencies that do not interfere with incumbent uses. In the present example, $F_{usable}$ includes frequency channels 1, 3, 4, 6, 7, and 9, as illustrated below in Table 1. Although not calculated in FIG. 3 (in the present embodiment), $F_{usable,N1}$ for sector 206d includes channels 1, 2, 3, and 9, $F_{usable,N2}$ for sector 208e includes channels 1, 5, and 6, and $F_{usable,N3}$ for sector 208c includes channels 1, 4, 6, and 8. The information for neighbor sectors may be provided, for example, by the base station 204a for sector 206d, and may be known by the base station 204b for sectors 208e and 208c.

TABLE 1

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |

In step 304 (and corresponding FIG. 4b, where underlining indicates a used channel), the central sector 208d may identify $F_{pool}$, which may be the frequencies that are usable in the central sector 208d and are not used by neighbor sectors 206d, 208e, and 208c. To determine $F_{pool}$, the central sector 208d may need to identify the frequency channels used by neighbor sectors 206d, 208e, and 208c (i.e., $F_{used, N1}$, $F_{used, N2}$, and $F_{used, N3}$). In the present example, $F_{used, N1}$=2 and 9, $F_{used, N2}$=5, and $F_{used, N3}$=8. The frequency channels to be included in $F_{pool}$ include the channels in $F_{usable,ID}$ with the exception of the channels in $F_{used, N1}$, $F_{used, N2}$, and $F_{used, N3}$. Accordingly, $F_{pool}$ includes channels 1, 3, 4, 6, and 7, as illustrated below in Table 2. Channel 9 is excluded from $F_{pool}$ since it is in use by sector 206d.

TABLE 2

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |
| $F_{used}$ | 2, 9 | 5 | 8 |  |
| $F_{pool}$ |  |  |  | 1, 3, 4, 6, 7 |

In step 306, the central sector 208d may identify $F_{local}$, which may include the frequencies that are usable by the central sector and not usable by neighbor sectors. In the present example, central sector 208d may use frequency channel 7, but channel 7 cannot be used by neighbor sectors 206d, 208e, and 208c (i.e., channel 7 is in $F_{usable,ID}$, but is not in $F_{usable,N1}$, $F_{usable,N2}$, or $F_{usable,N3}$). Accordingly, channel 7 is in $F_{local}$ for central sector 208d, as illustrated below in Table 3.

TABLE 3

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |
| $F_{used}$ | 2, 9 | 5 | 8 |  |
| $F_{pool}$ |  |  |  | 1, 3, 4, 6, 7 |
| $F_{local}$ |  |  |  | 7 |

In step 308 (and corresponding FIG. 4c), a determination may be made as to whether any frequencies exist in $F_{local}$. If $F_{local}$ does not contain any frequencies, the method 300 continues to step 314. If $F_{local}$ contains at least one frequency, the frequency is selected in step 310. In the present example, channel 7 would be selected in step 310, as illustrated below in Table 4. The central sector 208d may also update $F_{used}$ in step 310 to notify other sectors that the selected channel is now in use.

TABLE 4

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |
| $F_{used}$ | 2, 9 | 5 | 8 | 7 |
| $F_{pool}$ |  |  |  | 1, 3, 4, 6, 7 |
| $F_{local}$ |  |  |  | 7 |
| 1st selection |  |  |  | 7 |

In step 312, a determination may be made as to whether the central sector 208d needs additional frequencies. If not, the method 300 may end. If the central sector 208d does need additional frequencies, the method 300 may return to step 308 to determine if $F_{local}$ contains another available frequency. If $F_{local}$ contains another available frequency, it may be selected in step 310 as previously described. It is understood that steps 308, 310, and 312 may be repeated until the central sector 208d has enough frequency channels or until $F_{local}$ contains no more available frequencies.

In the present example, $F_{local}$ contains only channel 7 and the method 300 continues to step 314 (and corresponding FIG. 4d) to secure another frequency channel for the central sector 208d. In step 314, the method 300 attempts to identify a frequency that, if selected by the central sector 208d, will have the least impact on the neighbor sectors 206d, 208e, and 208c. For example, step 314 may entail examining $F_{usable,N1}$, $F_{usable,N2}$, and $F_{usable,N3}$ to determine which channels are usable by fewer of the neighbor sectors 206d, 208e, and 208c than other channels. Note that channels in $F_{used, N1}$, $F_{used, N2}$, and $F_{used, N3}$ may be excluded from this analysis. Accordingly, $F_{usable,N1}$\$F_{used, N1}$={1, 3}, $F_{usable,N2}$\$F_{used, N2}$={1, 6}, and $F_{usable,N3}$\$F_{used, N2}$={1, 4, 6}.

In the present example, channel 3 is usable only by neighbor sector 206d, channel 4 is usable only by neighbor sector 208c, channel 6 is usable by neighbor sectors 208e and 208c, and channel 1 is usable by all three neighbor sectors. Therefore, identifying the impact of frequency channels based only on their usability may result in channel 3 and 4 having the least impact (a single neighbor sector), channel 6 having the next level of impact (two neighbor sectors), and channel 1 having the most impact (three neighbor sectors). Accordingly, in the present example, one of channels 3 and 4 may be identified in step 314 and selected in step 316. The selection of the particular channel may be random or may use other criteria (e.g., past traffic patterns may indicate that channel 3 is more likely to be needed than channel 4). In the present example, channel 4 is selected, as illustrated below in Table 5. The central sector 208d may also update Fused in step 316 to notify other sectors that the selected channel is now in use.

TABLE 5

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |
| $F_{used}$ | 2, 9 | 5 | 8 | 4, 7 |
| $F_{pool}$ |  |  |  | 1, 3, 4, 6, 7 |
| $F_{local}$ |  |  |  | 7 |
| $1^{st}$ selection |  |  |  | 7 |
| $2^{nd}$ selection |  |  |  | 4 (from 3, 4) |

In step 318, a determination may be made as to whether the central sector 208d needs additional frequencies. If not, the method 300 may end. If the central sector 208d does need additional frequencies, the method 300 may return to step 314 to identify another frequency that, if selected by the central sector 208d, will have the least impact on the neighbor sectors 206d, 208e, and 208c. It is understood that the method 300 may return directly to step 316 if the additional frequency has already been identified. For example, step 314 may identify each available frequency and their impact, and step 316 may simply select the needed number of frequencies from those identified.

Figure 4E:
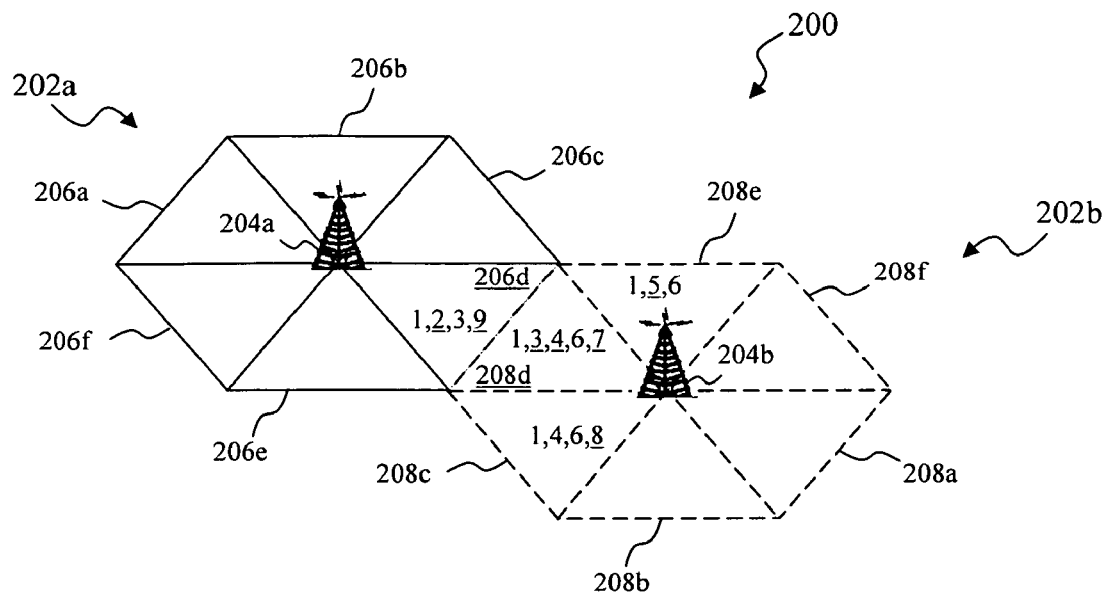

As stated previously, frequency channel 3 has the least impact of the remaining channels (i.e., 3, 6, and 1) and so may be selected in the current iteration of step 316 (and corresponding FIG. 4e). This is illustrated below in Table 6.

TABLE 6

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |
| $F_{used}$ | 2, 9 | 5 | 8 | 3, 4, 7 |
| $F_{pool}$ |  |  |  | 1, 3, 4, 6, 7 |
| $F_{local}$ |  |  |  | 7 |
| $1^{st}$ selection |  |  |  | 7 |
| $2^{nd}$ selection |  |  |  | 4 (from 3, 4) |
| $3^{rd}$ selection |  |  |  | 3 (from 3) |

Figure 4F:
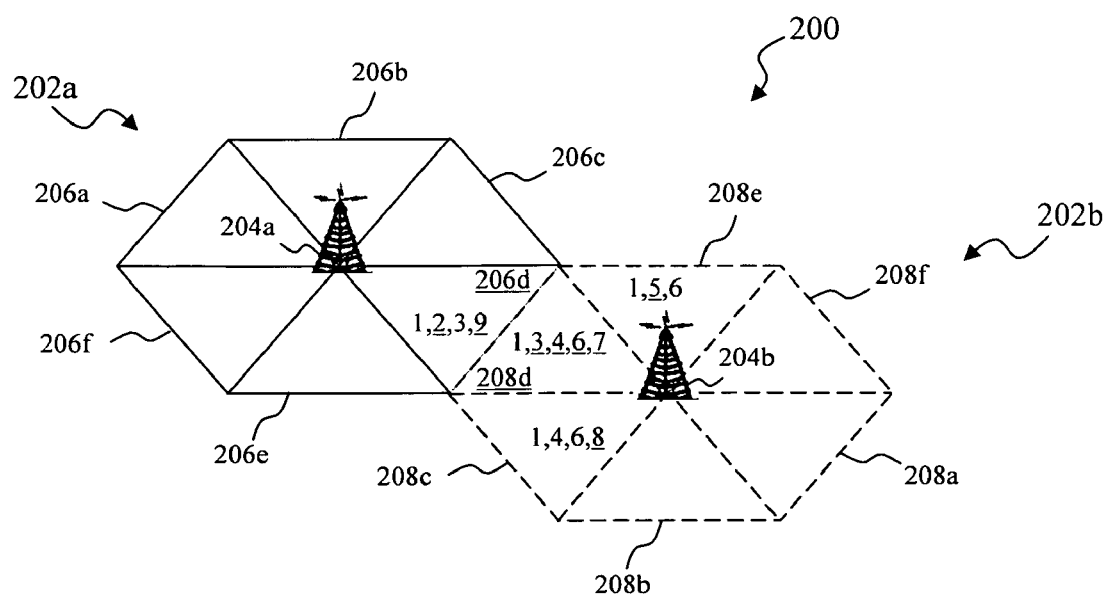
Figure 4G:
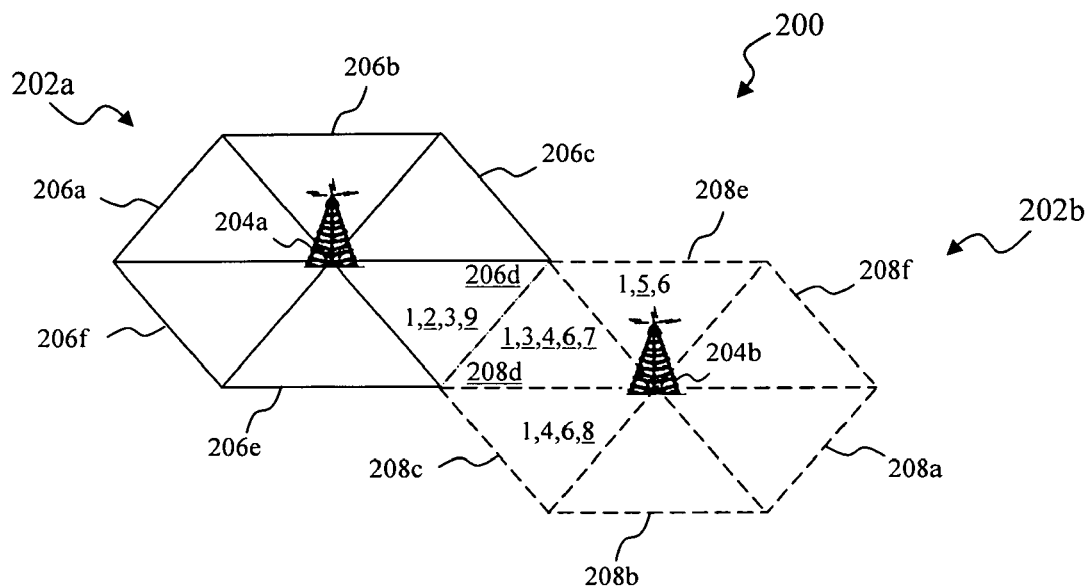

If needed, further iterations of step 316 may result in the selection of channel 6 followed by the selection of channel 1 (illustrated in FIGS. 4f and 4g, respectively). An example of the final channel allocation is illustrated below in Table 7.

TABLE 7

|  | Neighbor 1 | Neighbor 2 | Neighbor 3 | Central |
|---|---|---|---|---|
| $F_{usable}$ | 1, 2, 3, 9 | 1, 5, 6 | 1, 4, 6, 8 | 1, 3, 4, 6, 7, 9 |
| $F_{used}$ | 2, 9 | 5 | 8 | 1, 3, 4, 6, 7 |
| $F_{pool}$ |  |  |  | 1, 3, 4, 6, 7 |
| $F_{local}$ |  |  |  | 7 |
| $1^{st}$ selection |  |  |  | 7 |
| $2^{nd}$ selection |  |  |  | 4 (from 3, 4) |
| $3^{rd}$ selection |  |  |  | 3 (from 3) |
| $4^{th}$ selection |  |  |  | 6 (from 6) |
| $5^{th}$ selection |  |  |  | 1 (from 1) |

It is understood that restrictions may be placed on the central sector 208d to regulate its selection of channels. For example, central sector 208d may be limited to selecting a maximum number of channels or may be prohibited from selecting a channel usable by multiple neighbor sectors. Furthermore, past traffic patterns may be used to restrict the ability of the central sector 208d to select a particular channel or to select a channel that are usable by a particular sector. Accordingly, the actual selection process used by the central sector 208d may be modified in many different ways. In some embodiments, the method 300 may return to steps 302, 304, and/306 to recalculate some or all of $F_{usable}$, $F_{pool}$, and/or $F_{local}$. For example, if there are not enough frequencies available after all frequencies have been selected, the method 300 may return to step 302 to determine if additional frequency channels have become available.

It is understood that a neighbor cell or sector may not be immediately adjacent to a central sector. For example, sector 206e (FIG. 2) and other non-adjacent sectors may be included when determining which frequency channels to select using a method such as the method 300 of FIG. 3. Accordingly, the present disclosure is not limited to the use of immediately adjacent neighbor cells.

In other embodiments, the central sector 208d may request that a neighbor cell release a frequency channel if not enough channels are available for the central sector. For example, central sector 208d may request that the neighbor sector 206d release channel 9 for use by the central sector. In still other embodiments, the central sector 208d or a neighbor sector may mark a channel as used (e.g., may place the channel in the sector's $F_{used}$ set) to reserve the channel for future use. For example, if a sector anticipates an increased traffic volume at a particular time of day based on past traffic patterns, the sector may attempt to reserve one or more channels to serve the increased traffic volume while avoiding the need to identify available channels at the time they are needed.

Figure 5:
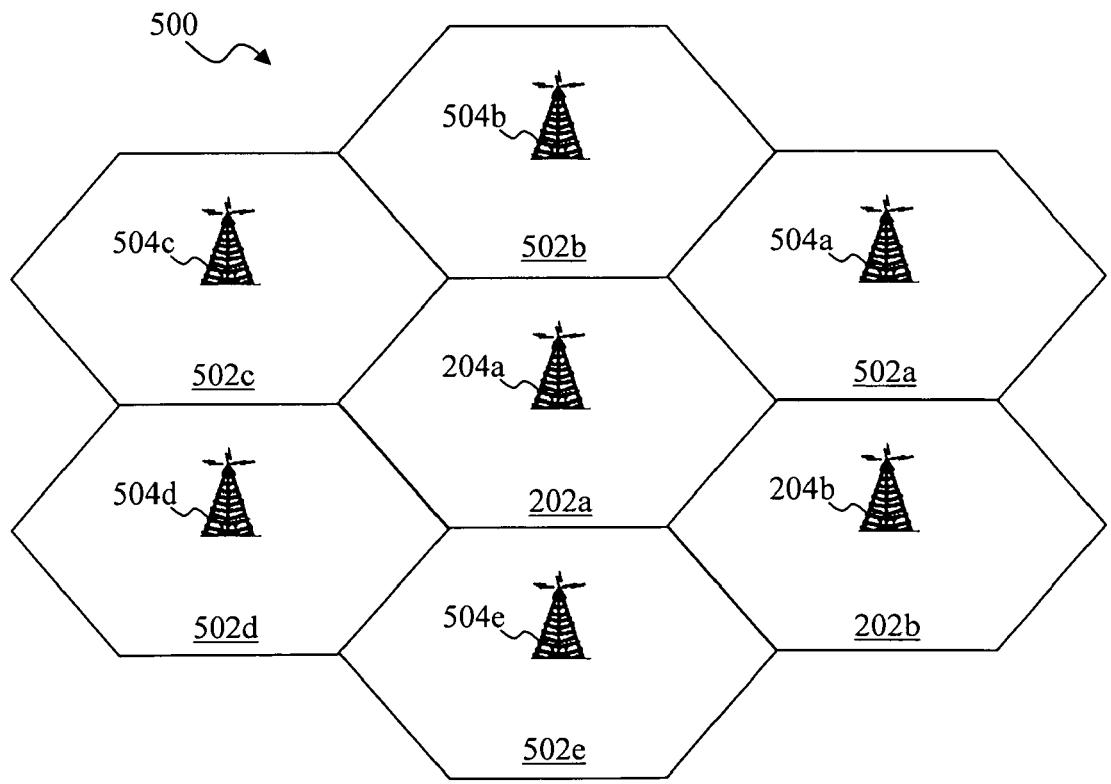
FIG. 5 is a diagram of another embodiment of a network in which the method of FIG. 1 may be implemented.

Referring to FIG. 5, an embodiment of a system 500 illustrates non-sectorized cells 202a and 202b (FIG. 2) and cells 502a-502e (having base stations 504a-504e, respectively). A method such as the method 100 of FIG. 1 or the method 300 of FIG. 3 may be used within the system 500 to dynamically select one or more frequencies for use by one of the cells. For example, if the cell 202a is the central cell, then the cell 202a may select frequencies based on $F_{usable,ID}$, $F_{used,ID}$, $F_{pool}$, and $F_{local}$ as described previously with respect to sectors. The selection may take into account $F_{usable}$ and $F_{used}$ for each of the neighbor cells 202b and 502a-502e (and other neighbor cells if non-adjacent cells are considered). Accordingly, a non-sectorized center cell may identify and select frequency channels dynamically based on previously described parameters.

Figure 6:
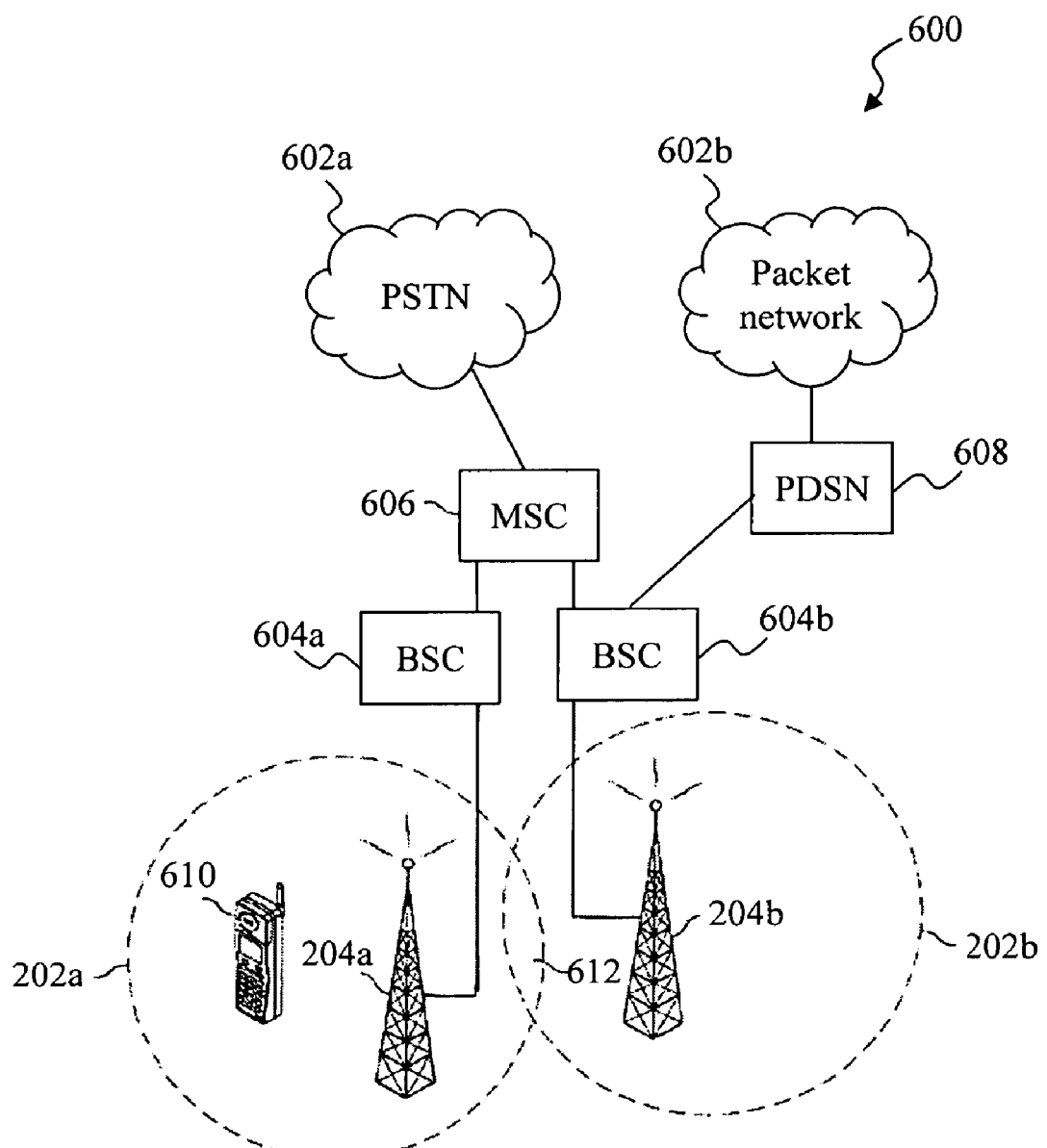
FIG. 6 is a diagram of yet another embodiment of a network in which the method of FIG. 1 may be implemented.

Referring to FIG. 6, a communications network 600 illustrates another embodiment of a system within which the method 100 of FIG. 1 may be executed. In the present example, the network 200 is a TDMA network that may be compatible with a variety of standards including, but not limited to, GSM. Accordingly, it is understood that the methods of the present disclosure may be performed in networks based on different technologies.

The network 600 includes a plurality of cells 202a, 202b (e.g., the cells 202a and 202b of FIG. 2). In the present example, the network 600 is a wireless network, and may be connected to other wireless and/or wireline networks, such as a Public Switched Telephone Network (PSTN) 602a and a packet network 602b. Each cell 202a, 202b in the network 600 includes a base station (BS) 204a, 204b, respectively, that are coupled to base station controllers (BSC) 604a, 604b, respectively. A mobile switching center (MSC) 606 may be used to connect the network 600 with other networks such as the PSTN 602a. Although not shown, the base stations 204a and 204b may be coupled to the same BSC, and the BSCs 604a and 604b may be coupled to separate MSCs. The BSC 604b may be coupled to a packet-switched node 608 (e.g., a packet data node such as a packet data serving node (PDSN)) that is coupled to the packet network 602b. It is understood that other network components, such as a Gateway Mobile Switching Center (GMSC), Home Location Register (HLR), Visitor Location Register (VLR), Authentication Center (AuC), Equipment Identity Register (EIR), and/or a Short Message Service Gateway, are not shown for purposes of clarity but may be included in the network 600. As such components are well known to those of skill in the art, they are not described in detail herein.

The network 600 enables a mobile device 610 to communicate with another device (not shown) via the BS 204a associated with the cell 202a in which the mobile device is located. Although illustrated in FIG. 6 as a cellular phone, it is understood that the mobile device 610 may be any portable device capable of wirelessly participating in a communication session, and such devices may include personal digital assistants, portable computers, pagers, and/or cellular phones. The cells 202a, 202b overlap so that the mobile device 610 may travel from one cell to another (e.g., from the cell 202a to the cell 202b) while maintaining a communication session. In a handoff region 612 (e.g., the area where the cells 202a, 202b overlap), the mobile device 610 may be serviced by both the BS 604a and the BS 604b. Frequency selection by the cells 202a and 202b, as well as frequency selection within the cells (if sectorized), may be accomplished using a method such as the method 100 of FIG. 1 and/or the method 300 of FIG. 3.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
   identifying by an access point of a central subdivision in a wireless communication system, a plurality of frequencies usable by the central subdivision that are not in use by neighboring subdivisions in the wireless communication system;
   determining, by the access point, whether the plurality of frequencies includes a first frequency that cannot be used by the neighboring subdivisions;
   selecting, by the access point, the first frequency for use by the central subdivision if the first frequency exists;
   identifying, by the access point, a second frequency of the plurality of frequencies that can be used by fewer of the neighboring subdivisions than other frequencies of the plurality of frequencies if the first frequency does not exist; and
   selecting, by the access point, the second frequency for use by the central subdivision.

2. The method of claim 1 further comprising:
   determining, by the access point, whether an additional frequency is needed by the central subdivision;
   determining, by the access point, whether the plurality of frequencies includes a third frequency that cannot be used by the neighboring subdivisions; and
   selecting, by the access point, the third frequency for use by the central subdivision if the third frequency exists.

3. The method of claim 1 further comprising identifying, by the access point, a fourth frequency of the plurality of frequencies that can be used by an identical number of the neighboring subdivisions as the second frequency, wherein the second frequency is selected randomly from the second and fourth frequencies.

4. The method of claim 1 further comprising, if the plurality of frequencies usable by the central subdivision are all in use by the neighboring subdivisions, requesting, by the access point, that a neighboring subdivision release at least one of the plurality of frequencies for use by the central subdivision.

5. The method of claim 1 further comprising marking, by the access point, the selected first or second frequency to indicate that the selected first or second frequency is in use by the central subdivision.

6. A method comprising:
   identifying, by an access point of a central subdivision in a wireless communication system, a first set of frequency channels representing frequency channels usable by the central subdivision;
   identifying, by the access point, a second set of frequency channels representing frequency channels from the first set that are not in use by neighbor subdivisions in the wireless communication system;
   identifying, by the access point, a third set of frequency channels representing frequency channels from the second set that cannot be used by the neighbor subdivisions;
   selecting, by the access point, a first frequency channel from the third set for use by the central subdivision if the third set includes at least one frequency channel; and
   selecting, by the access point, a second frequency channel from the second set for use by the central subdivision if the third set does not contain at least one frequency channel.

7. The method of claim 6 further comprising selecting, by the access point, additional channels from the third set for use by the central subdivision until a number of channels needed by the central subdivision is met.

8. The method of claim 6 further comprising selecting, by the access point, the second channel from the second set for use by the central subdivision after the first channel is selected if the third set contains only the first channel and the central subdivision requires additional channels.

9. The method of claim 6 further comprising selecting, by the access point, the second channel from a plurality of frequency channels in the second set, wherein the second channel is selected because use of the second channel by the central subdivision has less impact on neighbor subdivisions than use of another of the plurality of frequency channels from the second set by the central subdivision.

10. The method of claim 9 wherein the second channel is selected from the plurality of frequency channels in the second set because the second channel is usable by fewer neighbor subdivisions that any other of the plurality of frequency channels in the second set.

11. The method of claim 9 wherein the second channel and a third channel are usable by fewer neighbor subdivisions that any other of the plurality of frequency channels in the second set, and wherein the second channel is selected randomly from a subset of the second and third channels.

12. The method of claim 9 wherein the second channel and a third channel are usable by fewer neighbor subdivisions that any other of the plurality of frequency channels in the second set, and wherein the second channel is selected from a subset of the second and third channels based on a traffic pattern.

13. The method of claim 6 further comprising updating, by the access point, a fourth set with the selected first or second channel, wherein the fourth set represents frequency channels in use by the central subdivision.

14. The method of claim 6 further comprising requesting by the access point that a neighbor subdivision release a frequency channel if the first and second sets are empty.

15. The method of claim 6 further comprising reserving, by the access point, the selected first or second channel for future use by the central subdivision.

16. A wireless communication system comprising:
a central subdivision;
a central base station configured to provide wireless coverage for the central subdivision, wherein the central base station is coupled to a processor configured to execute instructions stored on a memory, and wherein the instructions include instructions for:
identifying a first set of frequencies usable by the central subdivision; identifying a second set of frequencies containing frequencies from the first set that are not in use by neighbor subdivisions of the central subdivision;
determining whether the second set includes a first frequency that cannot be used by the neighbor subdivisions; and
selecting the first frequency for use by the central subdivision if the first frequency exists.

17. The wireless communication system of claim 16 further comprising instructions for:
determining whether the second set includes a second frequency that is usable by fewer of the neighboring subdivisions than other frequencies of the second set if the first frequency does not exist; and
selecting the second frequency for use by the central subdivision.

18. The wireless communication system of claim 16 wherein the central subdivision forms part of a wireless regional access network (WRAN).

19. The wireless communication system of claim 16 wherein the central subdivision is a cell.

20. The wireless communication system of claim 16 wherein the central subdivision is a sector.

* * * * *